July 18, 1961      G. RABOW      2,992,837

VEHICLE SUSPENSION AND STABILIZING SYSTEM

Filed Nov. 3, 1958      3 Sheets-Sheet 1

Inventor
GERALD RABOW
By *Perry P. Lenty*
Attorney

Inventor
GERALD RABOW

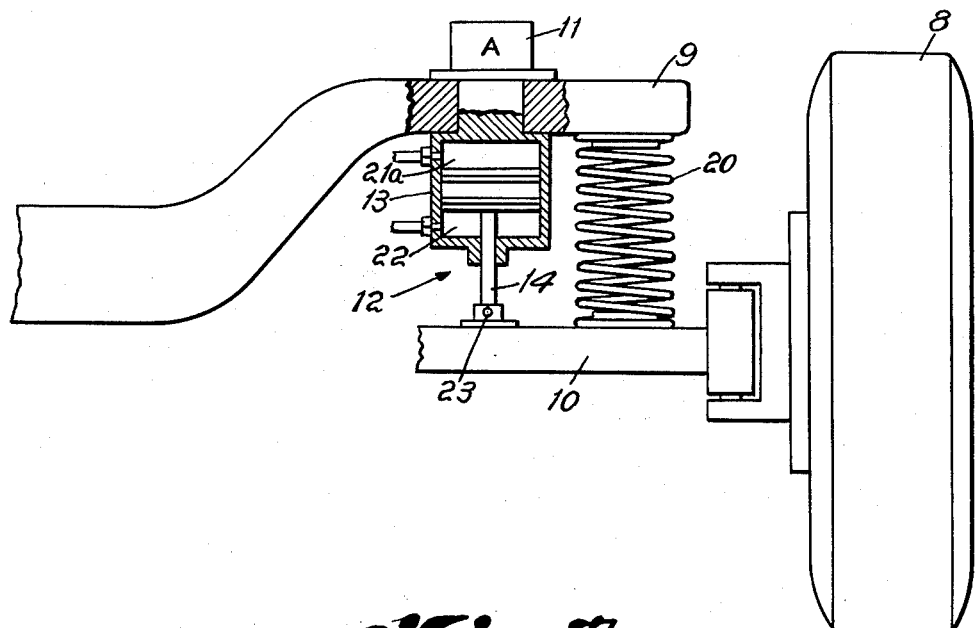
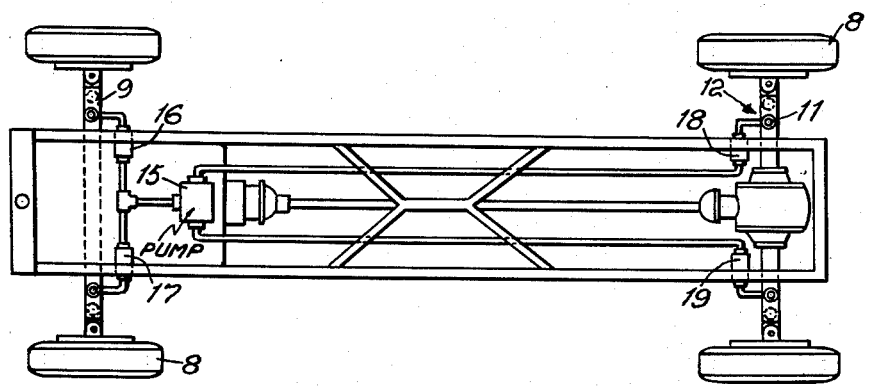

United States Patent Office 2,992,837
Patented July 18, 1961

2,992,837
VEHICLE SUSPENSION AND STABILIZING SYSTEM
Gerald Rabow, Brooklyn, N.Y., assignor to International Telephone and Telegraph Corporation, Nutley, N.J., a corporation of Maryland
Filed Nov. 3, 1958, Ser. No. 771,557
4 Claims. (Cl. 280—124)

The invention relates to a suspension and stabilizing system for automotive vehicles and more particularly to a suspension system for minimizing vertical acceleration effects caused by irregularity of the road.

Suspension systems for vehicles and particularly for automobiles are, of course, theoretically designed to give the maximum in smooth riding for the passenger, regardless of the roughness of the road over which the vehicle is traveling. However, in spite of all the improvements that have been effected to date to provide this ideal smooth ride, it is apparent that this ideal has not been obtained. A trip in an automobile on ordinary roads at medium speed or on highways at higher speed is far from being always comfortable, the back seats being usually worse than the front seats. Similar observations may be made regarding riding conditions on railroad cars. In order to have relatively satisfactory suspension performance, the manufacturers have to use heavy frames and bodies, much heavier than necessary for strength, tending towards unnecessarily large heavy automobiles. Means have been suggested for correcting unbalance in automobile suspension which are caused by turning of the vehicle or road irregularities which depend upon differential pressures produced in the hydraulic suspension to produce counteracting hydraulic fluid flow to equalize the pressures and restore the vehicle balance. Arrangements have been suggested using pendulums which are moved from an equilibrium condition by unbalancing forces and thereupon operate valves or other adjusting devices to equalize pressures in the cylinders of hydraulic suspension in an effort to provide a level ride. No attempt is made to measure the disturbing force and apply an equal and opposite force when the direction and amplitude of the disturbing force is ascertained. Mechanically, the prior art tries to equalize in an unrefined manner pressures in the hydraulic suspension or attempts to maintain a pendulum in the equilibrium condition.

An object of this invention is to provide a suspension and stabilizing system for vehicles which will provide an improved ride, adjusting to the condition of the road over which the vehicle is traveling.

Another object is to provide a means for minimizing vertical acceleration effects upon the body of the automotive vehicle regardless of the condition of the road that is being traversed by the vehicle.

Another object is to provide an improved suspension system useful for relatively light weight vehicles which is capable of maintaining the vehicle body substantially stable regardless of irregularity of the road surface usually encountered and at the usual speeds such vehicles are driven.

A feature of this invention is the provision of a suspension and stabilizing system for an automotive vehicle using a servo system for maintaining the body of the vehicle in a substantially stable condition during the operation thereof. Each wheel of the vehicle has suspension means connecting the wheel to the body and means to sense changes in the force supporting the body through the wheel and suspension means which tend to cause the body to deviate from the desired stable condition. Means controlled by the sensing means are provided to cause the suspension means to vary its supporting force in a direction to counteract the detected changes in the force supporting the body and thereby maintain the body in a substantially stable condition.

A further feature is that the sensing means comprise an accelerometer placed on the body adjacent the wheel in the most favorable position for sensing a force acting on the body through that wheel and the associated suspension means. The accelerometer measures both the amplitude and the direction of the force and provides an error signal output which is applied to a servo system to operate the suspension to apply a counteracting force to the vehicle body.

Another feature is that the suspension means comprise a hydraulic suspension controlled by the servo system.

Still another feature is the provision of a suspension system for the vehicle which comprises both resilient and hydraulic suspension means, each connecting the wheel axle to the body and each in parallel relation to each other, the hydraulic suspension means being controlled by a servo system.

Still a further feature is that in another embodiment of this invention the resilient and hydraulic suspension means, each connecting the wheel axle of the body are in parallel concentric relation to each other.

Other and further objects of the present invention will become apparent, and the foregoing will be better understood with reference to the following description of embodiments thereof, reference being had to the drawings, in which:

FIG. 5 is a front elevational view of a second embodiment showing a second wheel with hydraulic and resilient suspension means;

FIG. 7 is a plan view of the assembly of the frame to the wheels of the vehicle.

Several prior methods for providing a smooth automobile ride have been referred to. The prior methods may be said to be of the open loop type of system. Here the variable to be controlled, as for instance, the vertical acceleration imparted to the vehicle body when the vehicle encounters irregularities in the road, is not measured. An estimate is made as to how some other variable should be controlled, as for instance, controlling the pressure in the cylinders of the hydraulic suspension to keep them substantially equal at all times. However, in such a system there is never perfect equalization and error is always present, since the acceleration force itself is not sensed or measured but rather the results, pressure changes, produced by the accelerating force. The method of this invention differs from the others in that it is a true closed loop control system, namely, that the variable to be controlled, the acceleration of the automobile body, is measured by an accelerometer and compared to the desired value (zero) and the difference used to supply appropriate corrective action. The accelerometer used in this invention may be a very simple device since it need be only a little more sensitive than the automobile passenger and can thus be produced quite inexpensively. In the desired stable condition of the vehicle body there would be zero output from the accelerometer; an upward force would produce an error signal voltage of one polarity and a downward force would cause an error voltage of the opposite polarity. Thus, the direction of the acceleration would be determined and also the amplitude though that is not absolutely essential since the correcting voltage when applied to the servo system would cause the counteracting force to be applied.

Figure 1:
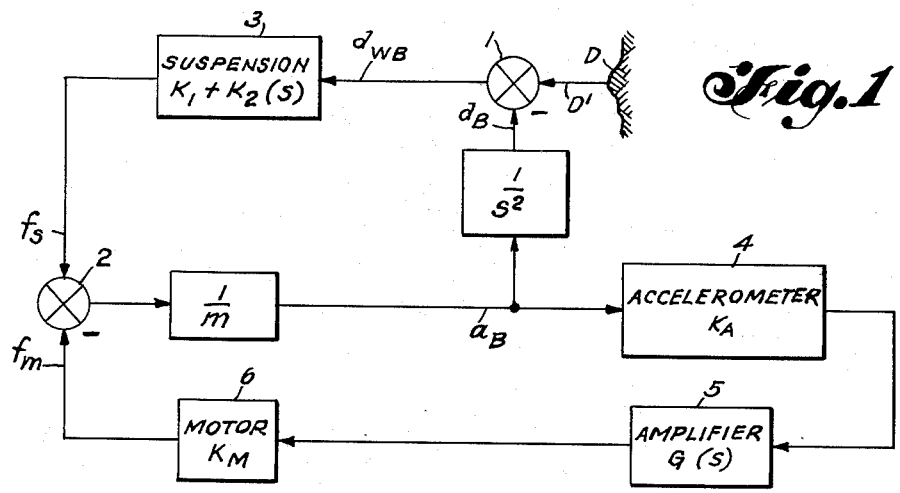
FIGS. 1 and 2 are schematic block diagrams illustrating the theory of this invention.

With reference to FIG. 1, the block diagram of a one dimensional system incorporating the principles of this invention is shown. It includes a conventional suspension system, which may be a spring or air suspension, plus a motor which may be a hydraulic device, as a hydraulic cylinder, capable of exerting an up or down force between the wheel and the body of a vehicle. An irregularity D in the road will cause a displacement D′ in the wheel 1, which will cause a relative motion $d_{WB}$ of the wheel with respect to the body 2 which transmits a force $f_S$ to the body through the suspension system 3 having spring constant $K_1$ and damping $K_2$. In the absence of a control loop, this force acting on the body of mass M would cause body acceleration $a_B$ and body displacement $d_B$. It is the purpose of the control loop indicated by the accelerometer 4, amplifier 5 and motor 6 to sense any acceleration $a_B$ and use it to supply force $$f_M = K_A G K_M a_B$$

so as to counteract $a_B$. To keep $a_B$ small, $f_M$ should be very nearly equal to $f_S$. There must be a limit $d_{WBL}$ over which this behavior can be allowed because of the finite (of the order of ±4″) permissible motion between body and wheel. This can be accomplished readily by limiting the motor force to $f_L = K_1 d_{WBL}$ so that for greater displacements the force of the suspension system is allowed to act. In this case, the damping forces should normally be considerably smaller than $f_L$. The burden of holding up the automotive vehicle rests with the conventional suspension system, such as the spring suspension, so that the leveling problems of open loop constant force systems are not encountered here.

It is appropriate at this point to show that such a closed loop hydraulic system can act effectively and rapidly to reduce the vertical accelerations in vehicles on wheels. The problem can be conveniently analyzed with reference to FIG. 2.

In order to facilitate the analysis of this problem the following assumptions have been made:

(1) The response of the system components is assumed linear. This assumption is essentially true for small signals. Also, this assumption greatly facilitates the analysis, and would not, in practice, change the essential characteristics of the system.

(2) The hydraulic fluid is incompressible at the pressure levels employed in this example. This is a valid engineering assumption.

(3) The wheels of the vehicle have negligible mass. Since the mass of the wheels is much less than that of the vehicle body, this is a valid assumption for a first analysis. As a logical result of this assumption, the analysis also assumes that the wheels are always in contact with the road.

(4) The accelerometer has zero D.C. drift. This difficulty can, in practice, be eliminated by some low frequency positional feedback.

(5) The time constant of the valve is negligible. At the frequencies encountered at normal automobile speeds this is a valid engineering assumption.

The following is a list of the symbols used in the analysis.

Table 1

| Symbol | Description | Units and numerical values (where applicable) |
|---|---|---|
| $x_1$ | Wheel and road displacement | ft. |
| $x_2$ | Body displacement | ft. |
| M | Mass of body—assumed loading of one wheel. | $\frac{1{,}000 \text{ lb.-sec.}^2}{g}$ ft. or slugs. |
| $Q_p$ | Rate of fluid flow into motor cylinder. | ft.³/sec. |
| $dm$ | Volume of cylinder/ft. of displacement of piston cylinder—assuming a 3½″ diameter cylinder. | 0.0665 ft.³/ft. |
| R | Motor leakage coefficient (assumes 20% leakage at maximum pressure and flow). | 2.19×10⁻⁵ ft.³/sec./lb./ft.² |
| $K_1$ | Spring constant (assumes a maximum permissible spring compression of 8 inches). | 1,500 lb./ft. |
| $f$ | Frequency | cycles/sec. |
| $w$ | Radian frequency | 1/sec. |
| $K_3$ | Accelerometer gain×amplifier gain×valve gain—based on an open loop gain of 100. | 49.5 ft.³/sec./ft./sec.² |
| S | Laplace transform operator | 1/sec. |
| $v$ | Velocity of vehicle | ft./sec. |

Figure 2:
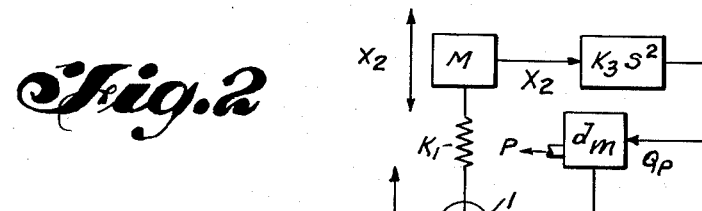

In FIG. 2, assume the vehicle is traveling at $v$ feet per second over a road having a sinusoidal ripple with a peak-to-peak value of 8 inches and a wavelength of 14 feet:

$$f = \frac{v}{14}$$

$$x_1 = \tfrac{1}{3} \sin wt \text{ ft.}$$

$$\frac{dx_1}{dt} = \frac{w}{3} \cos wt \text{ ft./sec.}$$

$$\frac{d^2 x_1}{dt^2} = -\frac{w^2}{3} \sin wt \text{ ft./sec.}^2$$

$x_2$ as a function of $Q_p$ and $x_1$ can be shown to be:

$$x_2 = \frac{Q_p \frac{dm}{KR}}{\frac{M}{K_1} S^2 + \frac{dm^2}{K_1 R} S + 1} + \frac{x_1\left(\frac{dm^2}{K_1 R} S + 1\right)}{\frac{M}{K_1} S^2 + \frac{dm^2}{R K_1} S + 1}$$

Also $$Q_p = S^2 x_2 K_3$$

and therefore $$\frac{x_2}{x_1} = \frac{\left(\frac{dm^2 S}{K_1 R} + 1\right)}{S^2\left(\frac{M}{K_1} + \frac{K_2}{K_1}\frac{dm}{R}\right) + \frac{dm^2}{R K_1} S + 1}$$

With a sinusoidal input the analysis may be done in the frequency domain in which case:

$$\ddot{x}_2(jw) = \frac{w^2}{3} \frac{\left(\frac{dm^2}{K_1 R} jw + 1\right)}{-w^2\left(\frac{M}{K_1} + \frac{K_3}{K_1}\frac{dm}{R}\right) + \frac{dm^2}{R K_1} jw + 1}$$

Substituting the numerical values from Table I in the above formula (I) $\quad \ddot{x}_2(jw) = \frac{-w^2}{3} \frac{0.146 jw + 1}{-w^2(0.0208 + 100) + 0.146 jw + 1}$ (II) $\quad \ddot{x}(jw) = \frac{-w^2}{(3)[-100 w^2 + 1]} \left[\frac{0.146 jw}{-100 w^2 + 1} + 1\right]$ Since $100 w^2 \gg 1$ (III) $\quad \ddot{x}_2(jw) = \frac{1}{300} \frac{0.146 jw + 1}{\frac{-0.146 j + 1}{100 w}} \text{ ft./sec.}^2$ Analysis of the system using spring support only $$\ddot{x}(jw) = \frac{w^2}{3} \frac{1}{\frac{M}{K_1}(jw)^2 + 1}$$

$$\text{(IV)} \quad \dot{x}(jw) = \frac{w^2}{3} \frac{1}{-0.028w^2+1} \text{ft./sec.}^2$$

Table II
COMPARISON OF ACCELERATIONS OF SYSTEM WITH FEEDBACK AND SYSTEM WITH SPRING SUPPORT ONLY

| Vehicle velocity | Frequency | $\dot{x}(jw)$ Feedback system | $\dot{x}(jw)$ Spring support system |
| --- | --- | --- | --- |
| 833 ft./min | 1 | 1.35 | 395 |
| 1,670 ft./min | 2 | 2.01 | 46.2 |
| 2,500 ft./min | 3 | 2.92 | 39.6 |
| 3,330 ft./min | 4 | 3.82 | 37.6 |
| 4,170 ft./min | 5 | 4.68 | 37.1 |
| 5,000 ft./min | 6 | 5.56 | 36.7 |

It should be noted that the engineering values used in the above explanation are not necessarily the most optimum, but rather extremely conservative. For example, by using a $K_3$ of 495 instead of the 49.5 all the accelerations listed in Table II for the hydraulic feedback system would be multiplied by 0.1. Such a system might be more practical for trains, buses, or other vehicles where the use of more complex electronics would be permissible.

By inspecting Table II and Formulas I, II, III, and IV, it can be seen that the use of a hydraulic servo system with accelerometer feedback provides the following two important advantages in vehicle stabilization.

(1) Greatly reduced acceleration of vehicle body at all frequencies (2) A large reduction in the frequency and peak of the resonant point of the system.

As a practical point of interest it should be noted that the theoretical maximum pressure of the system is:

$$P_M = \frac{\text{Max. deflection} \times K_1}{\text{piston area}} = \frac{4 \text{ inches}}{12 \text{ inches}} \frac{1500}{0.0665}$$

$$= 7520 \frac{\text{lb.-ft.}}{\text{ft.}^3}$$

or $$P_M = \frac{7520}{144} = 52.3 \text{ lb./in.}^2$$

which is a very practical figure.

Figure 3:
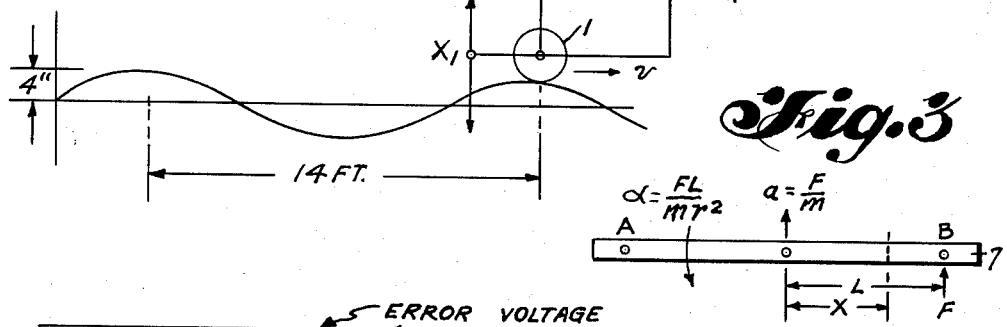
FIG. 3 is a diagram serving to illustrate the mathematical computation for determining the correct location of the accelerometer.

FIG. 1 includes just one accelerometer controlling the support at one wheel of the suspension system. We must consider possible cross coupling effects when 2, 3 or 4 such support points are to be controlled. In FIG. 3 there is shown a body 7 supported at points A and B. It is desired to ascertain where to place the accelerometer working with point A so that it is unaffected by forces occurring at point B. A force F at point B produces a linear acceleration $$\frac{F}{M}$$

and an angular acceleration $$\alpha = \frac{FL}{Mr^2}$$

where M is the mass of the body 7, L the distance from the center of gravity to point B, and r is the radius of gyration. The point on the body experiencing no acceleration is determined by:

$$\frac{F}{M} + \left(\frac{FL}{Mr^2}\right)X = 0$$

or $$X = \frac{-r^2}{L}$$

where X is the distance from the center of gravity to that point as shown by the dotted line in FIG. 3. This is the point at which the accelerometer should be placed. Of course, both the position of the center of gravity and the radius $r$ of gyration can change with variation in loading of the vehicle, and this can lead to a small amount of cross coupling. However, since we are dealing with the closed loop system, a moderate amount of cross coupling is tolerable. If L can be made equal to $r$ then forces at point A will produce no reaction at point B.

Figure 8:
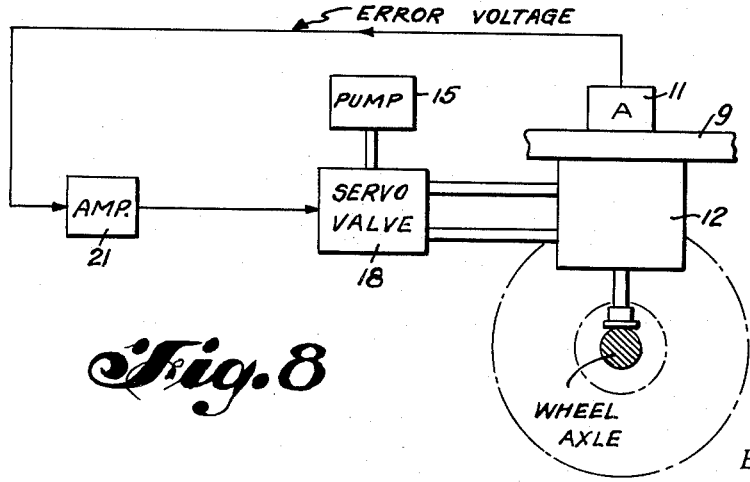
FIG. 8 is a schematic and flow diagram to explain the operation of this invention.
Figure 4:
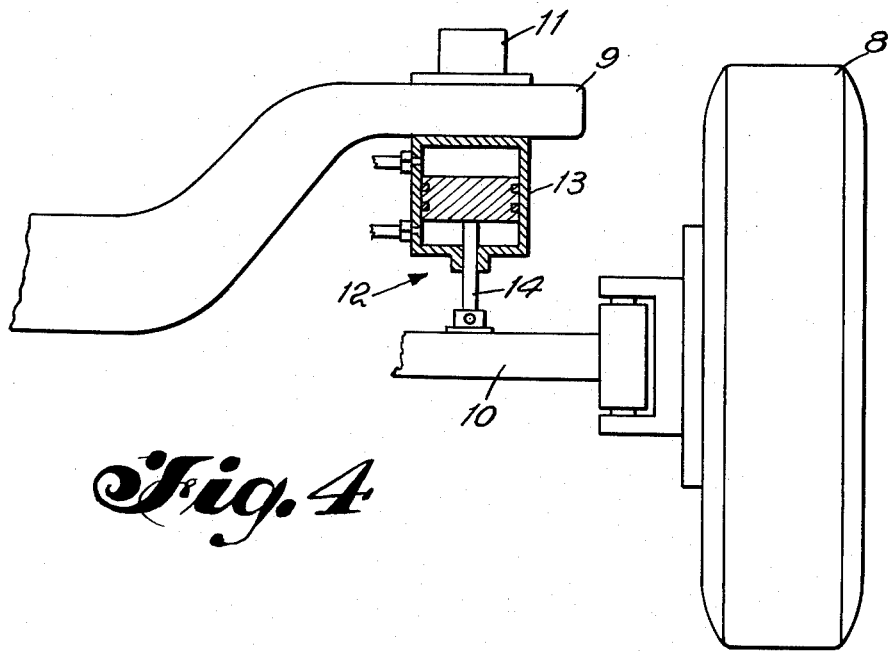
FIG. 4 is a front elevational view of one embodiment of the invention, showing a portion of the structure of a car having a wheel with a hydraulic suspension connecting the wheel to the frame.

With reference to FIG. 4 there is shown a simplified version of one wheel 8 of the vehicle suspended from the frame 9 thereof. For the sake of simplicity, no portion of the body is shown as the minimum amount of mechanical detail is given in order to illustrate the principles of this invention. Therefore, no attempt has been made to show the linkages and members used for steering the vehicle. The wheel 8 is rotatably coupled to the axle 10. The axle 10 is suspended from the frame 9 by means of a hydraulic device 12 which comprises a housing 13 connected to the frame 9. A piston 14 of the hydraulic device 12 is pivotally connected to the axle 10. As shown more particularly in FIG. 7, a hydraulic pump 15 is connected to servo valves 16, 17, 18 and 19 of the type, for instance, similar to those now presently being used. Each of the servo valves operates its associated hydraulic device on the frame adjacent to each wheel. According to the principles enunciated above an accelerometer 11 is located in the appropriate position adjacent the wheel 8 for sensing any force or change in force acting on the body of the vehicle through the wheel 8 and the hydraulic suspension 12 which would tend to change the normally stable condition of the vehicle. Referring to FIG. 8, it can be seen that a change in force acting on the body through, for instance, the wheel 8 and the hydraulic suspension device 12 will be sensed by the accelerometer 11 the instant this change starts to affect the normally stable condition of the vehicle which will thereupon deliver an error voltage proportional to the sensed change in force and indicative of the direction of the change, such as an upward force if the wheel were to strike a pump in the roadway or a downward force that would occur if the wheel were to move into a depression in the roadway. This error voltage is fed into an amplifier 21 and the output of the amplifier 21 is fed into the torque motor coils (not shown) of the servo valve 18. The connections are so arranged that if a downward change in the supporting force is exerted on the vehicle body, such as when the wheel moves into a depression, then the accelerometer sensing that change would supply immediately an error voltage that would activate the servo valve to supply fluid under increased pressure to the upper portion 21a of the hydraulic device 12 which will move the piston downward thus tending to move the vehicle body upward, counteracting almost immediately the start of a downward movement of the body thus maintaining substantially constant the desired stable condition of the body. On the other hand, if the wheel were to strike an obstruction in the roadway, the upward change in force would be sensed by the accelerometer 11 and an error voltage output would result which when fed into the servo valve 18 will activate the servo valve to send fluid under increased pressure to the lower portion 22 of the hydraulic device 12, thus moving the piston upward thus countering the change caused by the obstruction. It is evident that the action of this closed loop is to sense in an extremely rapid fashion any change in the force supporting the body of the vehicle which tends to deviate it from a zero reference or stable condition and by applying a counter force through the hydraulic device serve to maintain the body of the vehicle in the desired stable condition.

Figure 6:
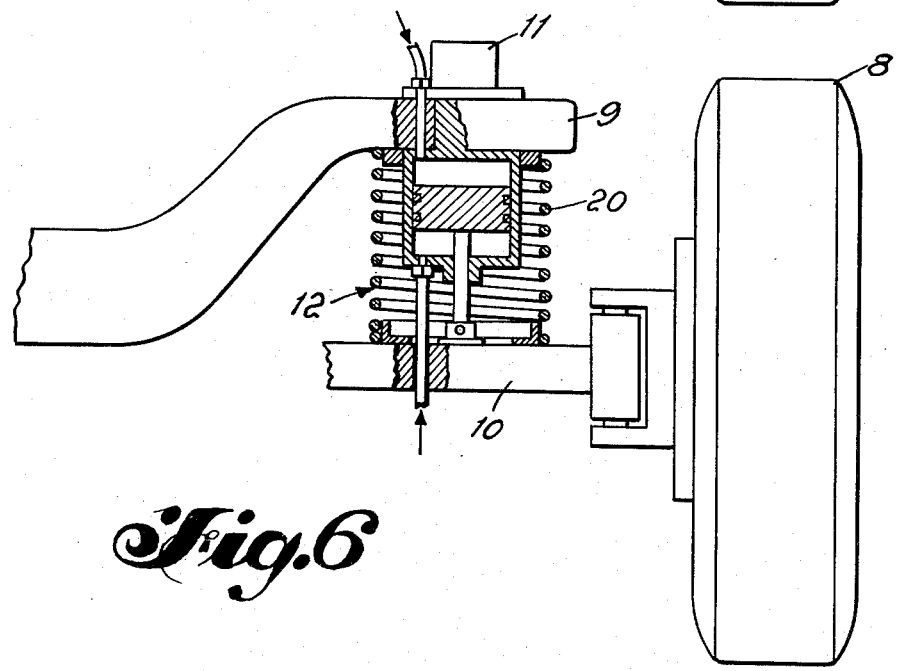
FIG. 6 is a front elevational view of a third embodiment illustrating resilient and hydraulic suspension means in concentric and parallel relation to each other.

While FIG. 4 illustrates the invention as applied to a hydraulic suspension system, it is evident that the vehicle body would be lowered when the motor is not running and the hydraulic fluid would not be under pressure. To obviate this condition and provide for suspension of the body at all times, embodiments of this invention including resilient suspension in addition to the hydraulic suspension are illustrated in FIGS. 5 and 6. In FIG. 5 a resilient suspension in the form of the helical spring 20 connecting the axle 10 to the frame 9 is provided in conjunction with the hydraulic device 12, and in parallel relation thereto. It is desirable that the spring 20 be placed as closely as possible to the device 12 to minimize any turning motion of the axle about the pivot point 23 of the piston coupling to the axle 10 or about the spring 20 coupling to the axle. FIG. 6 illustrates a preferred embodiment of the combined hydraulic and resilient suspensions. In this case the hydraulic device 12 is disposed concentrically within the spring 20 so that any turning motion of the axle about either coupling point of the spring or the hydraulic device due to the action of either suspension is eliminated.

It is apparent that the principles of this invention can be applied where the disturbing force is in a direction other than vertical to sway and lateral motion.

It is to be understood that the principles of this invention can be applied to railroad vehicles and particularly lightweight trains to improve their riding characteristics.

While I have described above the principles of my invention in connection with specific apparatus, it is to be clearly understood that this description is made only by way of example and not as a limitation to the scope of my invention as set forth in the objects thereof and in the accompanying claims.

I claim:
1. A suspension system for a vehicle for maintaining the body of said vehicle in a substantially stable condition during operation thereof comprising for each wheel of said vehicle, resilient and hydraulic suspension means, each said suspension means connecting a wheel to said body, an accelerometer carried by said body adjacent said wheel having an error voltage output to sense a change in the vertical force supporting said body through said wheel and said suspension means tending to cause said body to deviate from said stable condition, servo means, means coupling the output of said servo means to said hydraulic suspension means and means coupling the output of said accelerometer to said servo means whereby in response to the error voltage output of said accelerometer, said servo means causes said hydraulic suspension means to vary its supporting force in a direction to counteract said change and thereby maintain said body in the desired substantially stable condition.

2. A suspension system for a vehicle for maintaining the body of said vehicle in a substantially stable condition during operation thereof comprising for each wheel of said vehicle, resilient and hydraulic suspension means, each said suspension means connecting said wheel to said body and in parallel relation to each other, an accelerometer having an error voltage output disposed on said body adjacent said wheel to sense a change in the vertical force supporting said body through said wheel and said suspension means tending to cause said body to deviate from said stable condition, servo means, means coupling the output of said servo means to said hydraulic suspension means, and means coupling the output of said accelerometer to said servo means whereby in response to the error voltage output of said accelerometer said servo means causes said hydraulic suspension means to vary its supporting force in a direction to counteract said change and thereby maintain said body in the desired substantially stable condition.

3. A suspension system for a vehicle for maintaining the body of said vehicle in a substantially stable condition during operation thereof comprising for each wheel of said vehicle, resilient and hydraulic suspension means, each said suspension means connecting said wheel to said body and in parallel relation to each other, an accelerometer having an error voltage output disposed on said body adjacent said wheel to sense a change in the vertical force supporting said body through said wheel and said suspension means tending to cause said body to deviate from said stable condition, a servo hydraulic valve, a hydraulic fluid pump, means coupling the output of said pump to said servo valve, means coupling the output of said accelerometer to the motor of said servo valve and means coupling the hydraulic fluid output of said servo valve to said hydraulic suspension means whereby in response to the error voltage output of said accelerometer, said servo valve transmits hydraulic fluid under pressure to said hydraulic suspension means to move said hydraulic suspension in a direction to counteract said change and thereby maintain said body in the desired substantially stable condition.

4. A suspension system for a vehicle for maintaining the body of said vehicle in a substantially stable condition during operation thereof comprising for each wheel of said vehicle, an axle connected to said wheel, resilient and hydraulic suspension means, each said suspension means connecting said axle to said body and in parallel relation to each other, said hydraulic suspension means including a cylinder connected to said body and a piston pivotally connected to said axle and movable within said cylinder in response to the urging of hydraulic fluid within said cylinder, an accelerometer having an error voltage output disposed on said body adjacent said wheel to sense a change in the vertical force supporting said body through said wheel and said suspension means tending to cause said body to deviate from said stable condition, an amplifier, means coupling the output of said accelerometer to said amplifier, a servo hydraulic valve, a hydraulic fluid pump, means coupling the output of said pump to said servo valve, means coupling the output of said amplifier to the motor of said servo valve and means coupling the hydraulic fluid output of said servo valve to said cylinder whereby in response to the error voltage output of said accelerometer, said servo valve transmits hydraulic fluid under pressure to said cylinder to move said piston in a direction to counteract said change and thereby maintain said body in the desired substantially stable condition.

References Cited in the file of this patent

UNITED STATES PATENTS

| | | |
|---|---|---|
| 2,620,182 | Marston | Dec. 2, 1952 |
| 2,754,465 | Brier | July 10, 1956 |
| 2,851,795 | Sherman | Sept. 16, 1958 |
| 2,857,171 | Lane | Oct. 21, 1958 |
| 2,860,889 | Hanna | Nov. 18, 1958 |